June 9, 1925.  1,540,924
J. BOGDAN ET AL
PNEUMATIC CUSHION WHEEL
Filed Aug. 13, 1923  2 Sheets-Sheet 1
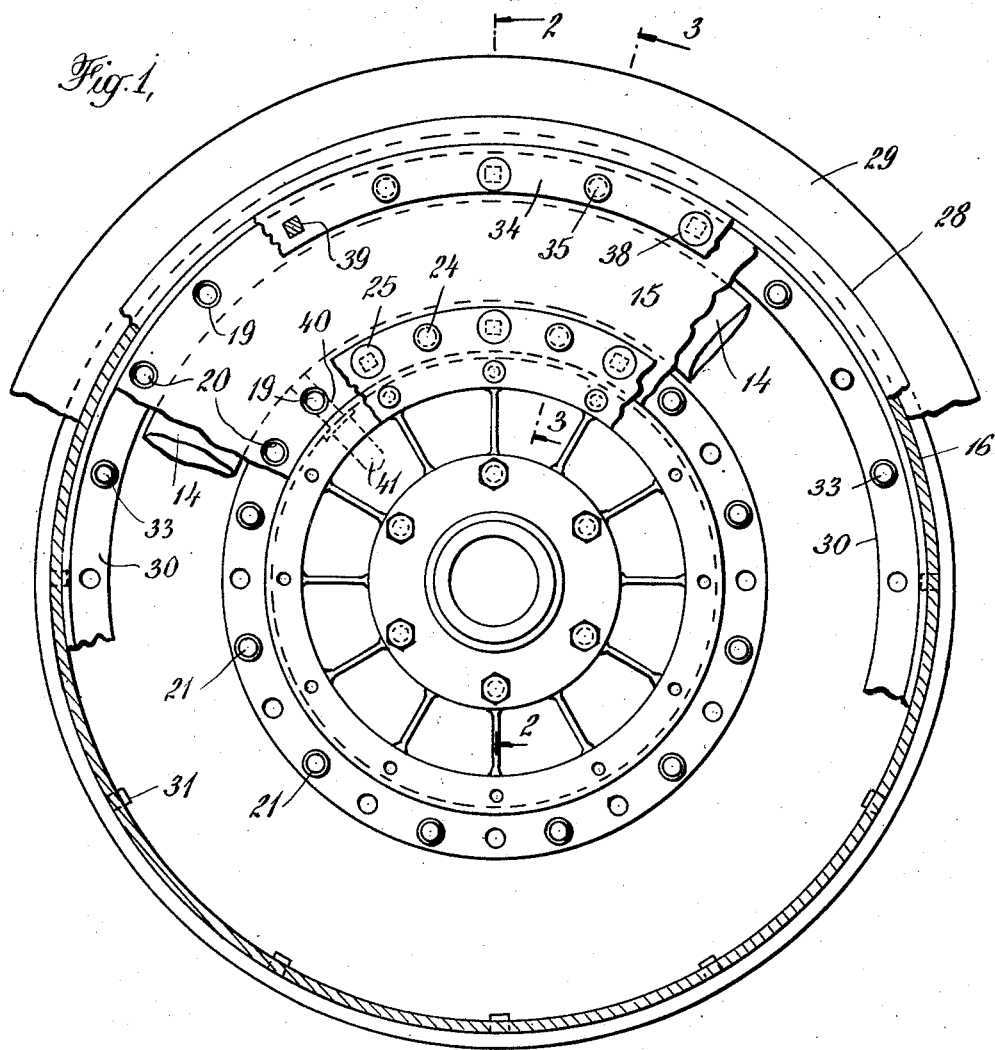
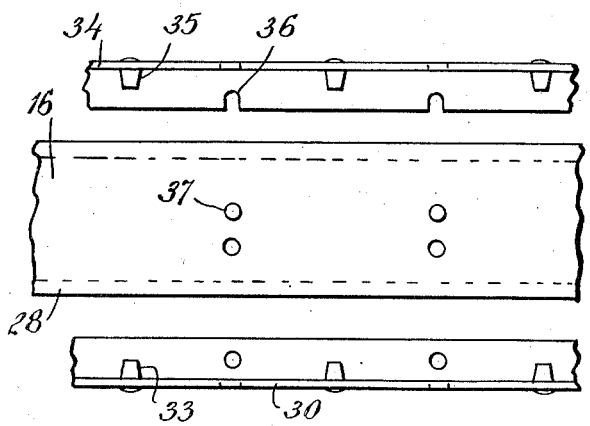
INVENTOR
John Bogdan
Joseph A. Anglada
BY
ATTORNEY June 9, 1925.  
J. BOGDAN ET AL  
1,540,924  
PNEUMATIC CUSHION WHEEL  
Filed Aug. 13, 1923  
2 Sheets-Sheet 2
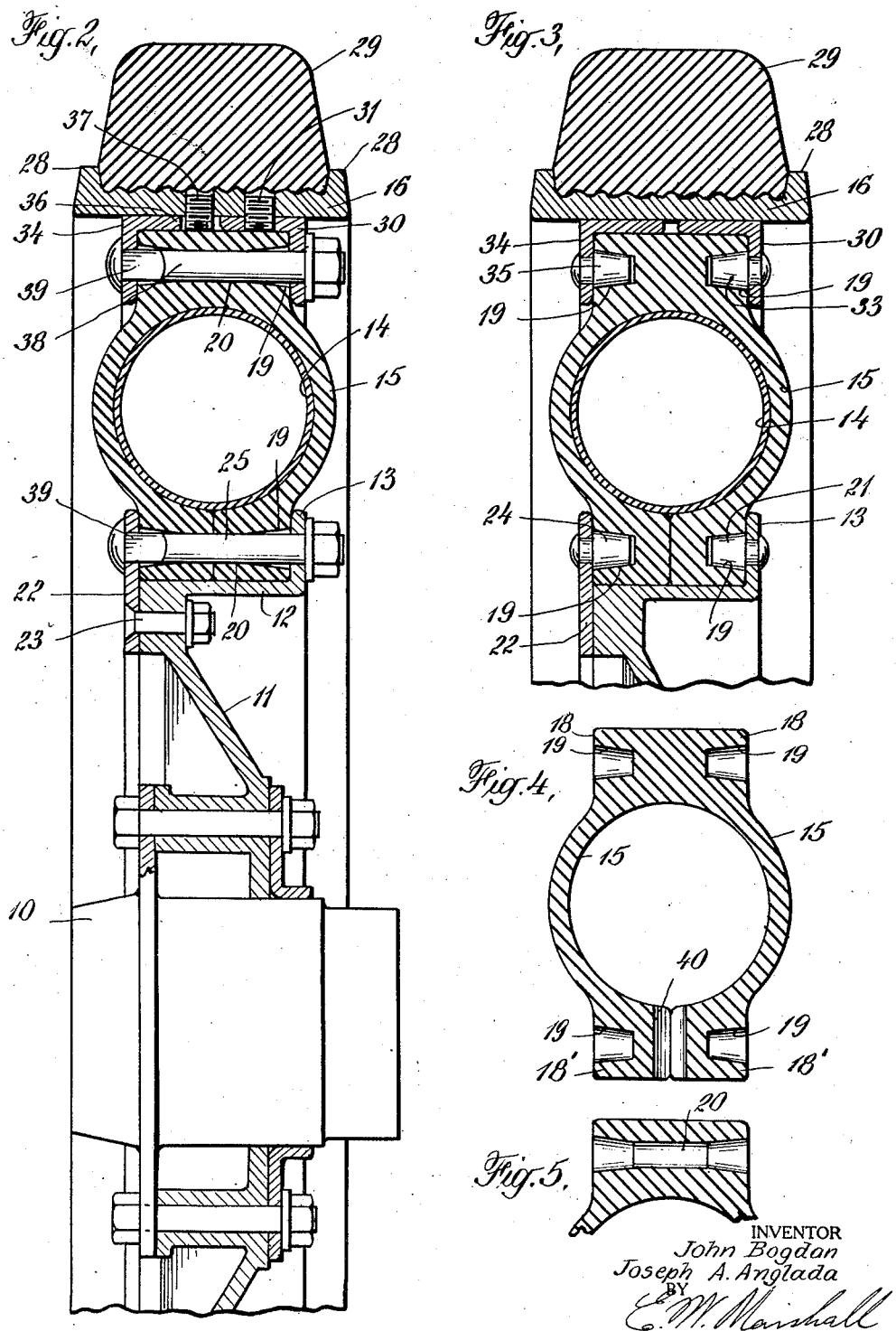
INVENTOR  
John Bogdan  
Joseph A. Anglada  
BY  
E. W. Marshall  
ATTORNEY Patented June 9, 1925.

1,540,924

UNITED STATES PATENT OFFICE.

JOHN BOGDAN, OF NEWARK, NEW JERSEY, AND JOSEPH A. ANGLADA, OF JENKINTOWN, PENNSYLVANIA.

PNEUMATIC CUSHION WHEEL.

Application filed August 13, 1923. Serial No. 657,090.

*To all whom it may concern:*

Be it known that we, JOHN BOGDAN, a citizen of the United States, and a resident of Newark, county of Essex, and State of New Jersey, and JOSEPH A. ANGLADA, a citizen of the United States, and a resident of Jenkintown, county of Montgomery, and State of Pennsylvania, have invented certain new and useful Improvements in Pneumatic Cushion Wheels, of which the following is a specification.

This invention relates to vehicle wheels and particularly to cushion wheels.

With the usual wheel where a pneumatic tire is used for cushioning the wheel the tire is mounted on the outer periphery or rim of the wheel and is thereby subject to wear and to injury from punctures.

This invention has for its salient object to provide a vehicle wheel having a pneumatic cushioning element spaced from the outer periphery of the wheel and thereby not subject to wear or puncture.

Another object of the invention is to provide a wheel having shock absorbing or pneumatic cushioning means intermediate the body of the wheel and the wheel tire.

Another object of the invention is to provide a wheel of the character described so constructed and arranged that the parts can be easily and quickly assembled and when assembled will be firmly held in position.

Another object of the invention is to provide a wheel structure of the class described that will be simple in construction and can be economically manufactured.

Further objects of the invention will appear from the following specification taken in connection with the drawings which form a part of this application and in which, Fig. 1 is an elevational view, partly in section and partly broken away, of a wheel constructed in accordance with the invention.

Fig. 2 is a sectional elevation taken substantially on line 2—2 of Fig. 1.

Fig. 3 is a sectional elevation taken substantially on line 3—3 of Fig. 1.

Fig. 4 is a detail sectional view illustrating the construction of the shoe which houses the pneumatic tube.

Fig. 5 is a sectional elevation of a portion of the shoe shown in Fig. 4 and showing the bolt receiving opening therethrough, and Fig. 6 is a plan view showing disassembled the tire rim and the means for securing the tire rim to the outer periphery of the shoe.

The invention briefly described consists of a vehicle wheel comprising a body portion and a hub adapted to be mounted on the vehicle axle, a shoe clamped to the outer periphery of the body portion and a tire clamped to the outer periphery of the shoe. In the particular form of the invention illustrated the shoe is provided with tapered sockets for receiving tapered lugs carried respectively by the body portion and by the elements which secure the vehicle tire to the outer periphery of the shoe. Intermediate the tapered sockets the shoe has formed therein openings extending entirely through the shoe for receiving bolts. Although the wheel particularly illustrated has a disc body portion it should be understood that a spoked wheel or a wire wheel may be used if desired. Further details of the invention will appear from the following description.

Referring to the drawings the wheel comprises a hub 10 having a disc body portion 11 secured thereto. The disc body portion has a rim 12 formed thereon and the rim is provided with an outwardly extending peripheral flange 13.

The pneumatic tube 14 is housed in a split shoe 15 which is clamped on its inner periphery to the rim 12 and at its outer periphery is secured within the wheel tire rim 16.

The shoe 15 is split at its inner periphery and has an outer peripheral flange 18 and a pair of flange sections 18′ forming an inner flange. The portions 18 and 18′ are provided with annularly tapered sockets 19. These sockets at the outer and inner peripheries of the shoe or in the flanges are alined and alternate sockets are connected by openings 20 extending through the flange.

The flange 13 on the rim 12 has secured thereto laterally projecting tapered lugs 21 which are received by alternate sockets 19 and an annular plate 22 is bolted as shown at 23 to the body portion of the wheel and has secured thereto tapered lugs 24 disposed in alinement with the lugs 21 on the flange 13. Intermediate the tapered lugs 21 and 24, the flange and plate are connected by securing bolts 25 which extend through the openings 20 and securely clamp the inner periphery of the shoe to the body portion of the wheel.

The outer periphery of the shoe 15 is secured to the wheel tire rim 16 in the following manner. The tire rim 16 has flanges 28 for receiving a solid rubber or other tire 29. An angle clamp 30 is secured by screw plugs 31 to the rim 16 and this clamp has secured thereto inwardly projecting tapered lugs 33 which engage alternate sockets 19 at the outer peripheral portion 18 of the shoe. A second angle clamp 34 has formed thereon inwardly projecting lugs 35 corresponding to the lugs 33 and received by the sockets 19 disposed opposite the sockets in which the lugs 33 are received. The clamp 34 has a plurality of notches 36 formed on its inner edge and these notches receive screw plugs 37 disposed in alinement with the plugs 31 and carried by and projecting inwardly from the rim 16.

The alternate sockets 19 at the outer periphery of the shoes are connected by openings 20 and the angle clamps 30 and 34 are connected by bolts 38 extending through the two clamps and through the outer peripheral portion 18 of the shoe.

By tightening the nuts on the bolts 25 and 38 the tapered lugs 21 and 24, and 33 and 35 will be forced into the sockets 19 thereby firmly securing the shoe in position between the body portion of the wheel and the wheel tire.

The bolts 25 and 38 have squared portions 39 adjacent their heads and these portions are received by correspondingly shaped openings in the plate 22 and angle clamp 34.

The shoe 15 has formed therein an opening 40 for receiving the stem 41 of the valve for inflating the tube 14.

From the foregoing description it will be seen that a simple, practical and rugged construction of cushion wheel has been designed and that the parts can be easily and quickly assembled. Furthermore when assembled the elements are firmly secured together.

Although one specific embodiment of the invention has been particularly illustrated and described, it will be understood that the invention is capable of modification and that changes in the construction and in the arrangement of the various cooperating parts may be made without departing from the spirit or scope of the invention as expressed in the following claims.

What I claim is:—

1. A vehicle wheel comprising a body portion having a peripheral rim provided with an outwardly extending flange, a flexible shoe mounted on said rim, means including a plate secured to said body portion and to said shoe and flange for securing said shoe to said rim and flange, a rim secured to the outer periphery of said shoe and a wheel tire secured to said last named rim, said plate and said shoe having tapered interengaging portions and bolts extending through said plate, shoe and rim flange and securing the shoe to said rim.

2. A vehicle wheel comprising a body portion having a peripheral rim provided with an outwardly extending flange, a flexible shoe mounted on said rim, means including a plate secured to said body portion and to said shoe and flange for securing said shoe to said rim and flange, a rim secured to the outer periphery of said shoe and a wheel tire secured to said last named rim, said plate and said shoe and said flange and shoe having tapered interengaging portions and bolts extending through said plate, shoe and rim flange and securing the shoe to said rim.

3. A vehicle wheel comprising a body portion, having a rim provided with a flange, a plate, a wheel tire rim, a flexible shoe rigidly clamped to said rims, said rims and shoe being connected by tapered interengaging portions, and clamping bolts extending through the plate, shoe and rim flange and securing the shoe to the first named rim.

4. A vehicle wheel comprising a body portion having a rim, a flexible pneumatic shoe having tapered sockets therein, tapered lugs carried by the body portion for engaging said sockets, means comprising bolts extending through the rim and shoe for securing said lugs in said sockets and a tire rim clamped to the outer periphery of said shoe.

5. A vehicle wheel comprising a body portion having a rim, a flexible pneumatic shoe having tapered sockets therein, tapered lugs carried by the body portion for engaging said sockets, means for securing said lugs in said sockets, a tire rim, and means including lugs and sockets disposed substantially parallel to the wheel axis for securing said tire rim to said shoe.

6. A vehicle wheel comprising a body portion having a peripheral rim provided with an outwardly extending flange, a flexible shoe mounted on said rim, means including a plate secured to said body portion and to said shoe and flange for securing said shoe to said rim and flange, said flange and plate having tapered lugs and said shoe having tapered sockets for receiving said lugs and said flange and plate having registering apertures and said shoe having openings arranged between said lugs and adapted to register with the said openings and bolts extending through the openings in the flange, shoe and plate for securing the shoe to the rim, a rim secured to the outer periphery of said shoe and a wheel tire secured to said last named rim.

7. A vehicle wheel comprising a body portion having a peripheral rim provided with an outwardly extending flange, a flexible shoe mounted on said rim, means including a plate secured to said body portion and to said shoe and flange for securing said shoe to said rim and flange, angle clamps secured to the outer periphery of the shoe, a rim secured to one of said clamps, and plugs secured to said rim, the other clamp having notches adapted to receive said plugs.

In witness whereof, I have hereunto set my hand this 6th day of August, 1923.

JOHN BOGDAN.

In witness whereof, I have hereunto set my hand this 24 day of July, 1923.

JOSEPH A. ANGLADA.